April 7, 1925.  I. D. KENNER  1,532,763
GOVERNOR
Filed April 14, 1923
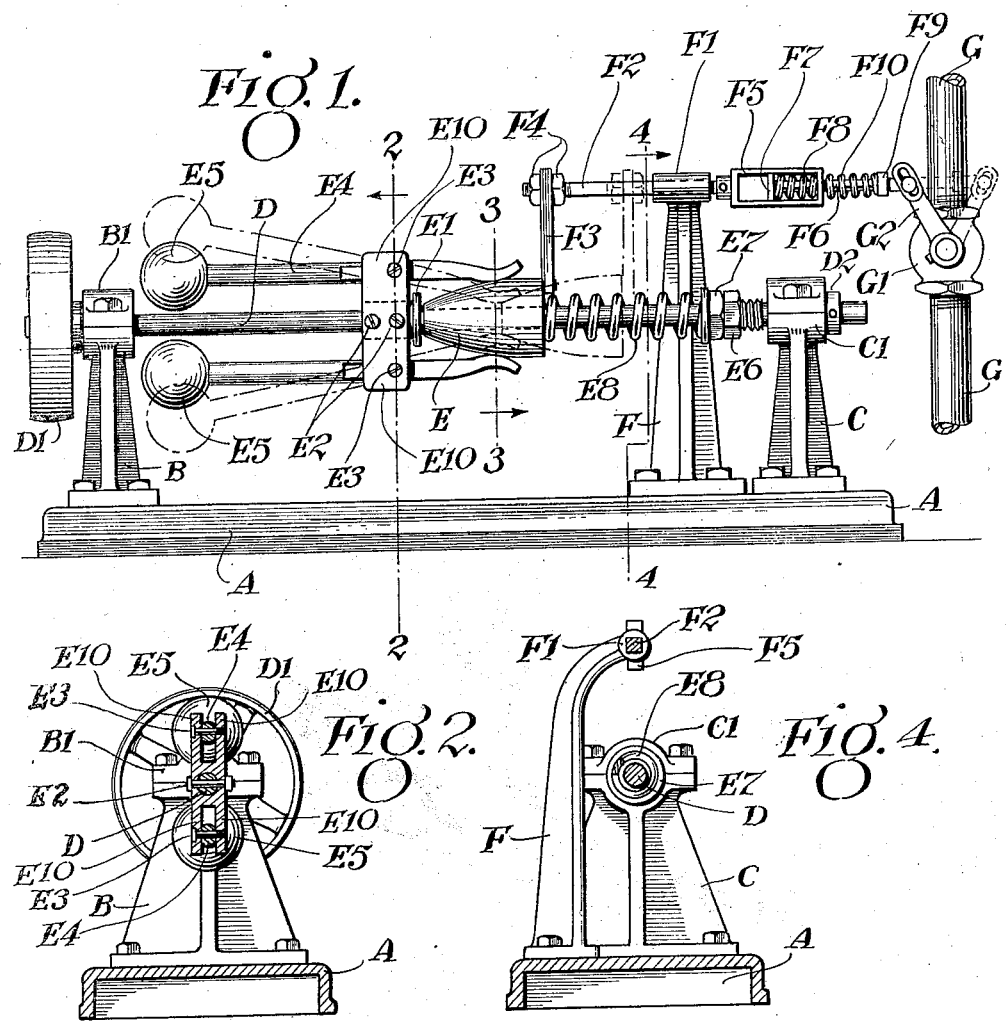

Patented Apr. 7, 1925.

1,532,763

UNITED STATES PATENT OFFICE.

ISAAC D. KENNER, OF KNOXVILLE, TENNESSEE.

GOVERNOR.

Application filed April 14, 1923. Serial No. 632,174.

*To all whom it may concern:*

Be it known that I, ISAAC D. KENNER, a citizen of the United States, residing at Knoxville, in the county of Knox and State of Tennessee, have invented a new and useful Improvement in Governors, of which the following is a specification, reference being had to the accompanying drawing.

This invention relates particularly to governors operated through centrifugal action exerted on a part of the mechanism.

The object of the invention is to produce a sensitive mechanism operating in this manner for controlling the flow of fluid to a fluid actuated motor, whether such fluid be water or steam or compressed air or hydrocarbon or electricity or any other form of fluid used for such purpose.

In the accompanying drawings,

Fig. 1 is a side elevation of a mechanism embodying my improvement;

Fig. 2 is an upright section on the line, 2—2, of Fig. 1, looking toward the left;

Fig. 3 is an upright section on the line, 3—3, of Fig. 1, looking toward the right;

Fig. 4 is an upright section on the line, 4—4, of Fig. 1, looking toward the right.

Referring to said drawings, A is a base. B is a pedestal or column on the left hand end of the base. C is a similar pedestal or column on the right hand end of the base. On the upper end of the pedestal, B, is a bearing, $B^1$. In the upper end of the pedestal, C, is a bearing, $C^1$. In said bearings rests a horizontal shaft, D. The left hand end of said shaft extends through the bearing, $B^1$, and supports a pulley, $D^1$, which is fixed on said shaft. The right hand end of the shaft extends through the bearing, $C^1$, and is there surrounded by a collar, $D^2$.

G is a pipe through which fluid is to be transmitted, such transmission being under control by action of the shaft, D, increased velocity of said shaft causing movement of the arm, $G^2$, of the valve, $G^1$, on said pipe in the direction to diminish flow through said pipe, and a reduction of the velocity of said shaft causing reverse movement of the arm, $G^2$.

A cone, E, surrounds the shaft, D, loosely so as to permit endwise movement on the shaft without rotation while the shaft rotates. The smaller end of this cone is directed toward the bearing, $B^1$. $E^6$ and $E^7$ are nuts threaded on the shaft. Between the nut, $E^7$, and the adjacent end of the cone an expanding coiled spring, $E^8$, surrounds the shaft and normally holds the cone against the abutment, $E^1$, fixed on the shaft. Thus the cone is adapted to be pressed endwise toward the bearing, $C^1$, and to automatically return, when released, against the abutment, $E^1$, which is secured rigidly to the shaft by cross bolts, $E^2$.

A standard, F, rises from the base near the standard, C, and behind the shaft, D. At its upper end said standard is turned forward into the upright plane of the shaft, D, and there supports a bearing, $F^1$. In that bearing is a rod, $F^2$, which is slidable endwise in said bearing. On the outer end face of the cone, E, is a rigid arm, $F^3$, which extends upward and loosely surrounds the rod, $F^2$. Said rod is threaded in and adjacent said arm. At each side of the arm a nut, $F^4$, surrounds the rod. By means of said nuts, said arm may be made rigid on the rod, $F^2$, and may be adjusted toward the right or left along the length of said rod. On the end of the bar, $F^2$, at the right of the bearing, $F^1$, is a yoke, $F^5$, which is in the form of an elongated open parallelogram. A rod, $F^6$, rests slidably in the right hand end of the yoke and has its right hand end coupled to the free end of the arm, $G^2$. Within the yoke, the rod has a head $F^7$. Between said head and the right hand end of the yoke, said rod is surrounded by an expanding coiled spring, $F^8$. Near the arm, $G^2$, said rod is surrounded by a collar, $F^9$. Between said collar and the adjacent end of the yoke, an expanding coiled spring, $F^{10}$, surrounds said rod. The springs, $F^8$, and $F^{10}$, permit limited sliding of the rod, $F^6$, in the yoke during endwise movement of the rod, $F^2$.

It will now be seen that if the cone, E, is moved endwise on the shaft, D, toward the bearing, $C^1$, the arm, $F^3$, and the rod, $F^2$, and the yoke, $F^5$, will be positively moved toward the valve arm, $G^2$, whereby the yoke will press the spring, $F^{10}$, toward the arm, $G^2$, whereby the rod, $F^6$, will be pressed toward the right or away from the bearing, $F^1$, whereby the arm, $G^2$, is turned toward the right or clock-wise, as viewed in Fig. 1. It will also be seen that when pressure on the cone, E, toward the bearing, $C^1$, is released so that the spring, $E^8$, which is large and strong compared with the springs, $F^8$ and $F^{10}$, can act, the cone will be moved toward the left, carrying with it the arm, $F^3$, and the rod, $F^2$, and the yoke, $F^5$, the latter exerting pressure upon the spring, $F^8$, whereby the rod, $F^6$, and the arm, $G^2$, are drawn toward the left, or contra-clockwise as viewed in Fig. 1.

The movement of the cone toward the right is effected by the action of two centrifugal arms, $E^4$, which are supported on the shaft, D, by means described below in such manner as to press against the cone transversely to the shaft or in a plane to which the shaft is perpendicular.

On the abutment, $E^1$, are two pairs of arms, $E^{10}$, placed at opposite sides of the shaft, D. At each side of the shaft, a centrifugal arm, $E^4$, is placed between the arms, $E^{10}$, and pivoted to said arms by means of transverse bolts, $E^3$. Thus said arms are supported and tiltable in a plane in which lies the shaft, D. The right hand ends of said arms extend nearly to the large end of the cone, E, and are adapted to bear upon the inclined face of the cone. Each of said arms has on its opposite end a weight, $E^5$, which tends to move away from the shaft, D, when velocity of the shaft is increased. Such centrifugal force thus exerted on said weights tends to tilt said arms and cause their opposite ends to press upon the inclined face of the cone in a direction transverse to the shaft, D, or in a plane to which said shaft is perpendicular. The line, 3—3, indicates said plane. Such pressure tends to move the cone endwise toward the bearing, $C^1$, against the yielding resistance of the spring, $E^8$, which, as above described, surrounds the shaft, D, between the cone and the nut, $E^7$, and if such centrifugal force becomes strong enough, the cone is so moved.

When the velocity of the shaft is again reduced, the force of such centrifugal action is also reduced, and thereupon the spring, $E^8$, again moves the cone toward or against the abutment, $E^1$.

The action of the spring, $E^8$, may be varied by changing the position of the nuts, $E^6$ and $E^7$, on the shaft, D.

The function or purpose of the springs, $F^8$ and $F^{10}$, on the rod, $F^6$, is to make the transmission between the cone, E, and the valve arm, $G^2$, elastic and not abrupt or positive. It is, of course, to be understood that these springs may be omitted and a rigid connection made between the arm, $F^3$, and the arm, $G^2$.

I claim as my invention,

1. In a mechanism of the kind described, the combination of a member to be controlled, a rotary shaft, a member slidable and non-rotary on said shaft and having an inclined face, means connecting said member and the member to be controlled, an abutment on the shaft for limiting movement of the sliding member in one direction, yielding means pressing the sliding member toward said abutment, and centrifugal members pivotally supported on the shaft for pressing on the inclined face of the sliding member transversely to the length of said shaft, substantially as described.

2. In a mechanism of the kind described, the combination of a member to be controlled, a rotary shaft, a member slidable and non-rotary on said shaft and having an inclined face, means connecting said member and the member to be controlled, an abutment on the shaft for limiting movement of the sliding member in one direction, yielding means pressing the sliding member toward said abutment, and centrifugal members pivotally supported on said abutment for pressing on the inclined face of the sliding member transversely to the length of said shaft, substantially as described.

3. In a mechanism of the kind described, the combination of a member to be controlled, a rotary shaft, a member slidable and non-rotary on said shaft and having an inclined face, means connecting said member and the member to be controlled, an abutment on the shaft for limiting movement of the sliding member in one direction, yielding means pressing the sliding member toward said abutment, and centrifugal arms substantially parallel to said shaft and pivoted thereto between their ends for pressing on the inclined face of the sliding member transversely to the length of the shaft, substantially as described.

4. In a mechanism of the kind described, the combination of a member to be controlled, a rotary shaft, a member slidable on said shaft and having an inclined face, an arm on said member, a slidable bar joined to said arm, and elastic means joining said bar to the member which is to be controlled, an abutment on the shaft for limiting movement of the sliding member in one direction, yielding means pressing the sliding member toward said abutment, and centrifugal members pivotally supported on the shaft for pressing on the inclined face of the sliding member transversely to the length of said shaft, substantially as described.

5. In a mechanism of the kind described, the combination of a member to be controlled, a rotary shaft, a member slidable on said shaft and having an inclined face, a slidable bar operatively connected with said slidable member, a second bar intermediate the first mentioned bar and the member to be controlled, and elastic means intermediate said two bars, an abutment on the shaft for limiting movement of the sliding member in one direction, yielding means pressing the sliding member toward said abutment, and centrifugal members pivotally supported on the shaft for pressing on the inclined face of the sliding member transversely to the length of said shaft, substantially as described.

6. In a mechanism of the kind described, the combination of a member to be controlled, a rotary shaft, a member slidable and non-rotary on said shaft and having an inclined face, means connecting said member and the member to be controlled, yielding means pressing the sliding member in one direction, means for limiting movement in that direction and centrifugal means supported on said shaft for pressing on the inclined face of the sliding member transversely to the length of said shaft for moving the sliding member in the opposite direction, substantially as described.

7. In a mechanism of the kind described, the combination of a member to be controlled, a driven rotary member, a member slidable and non-rotary on the axial line of the driven rotary member and having an inclined face, means connecting the slidable member and the member to be controlled, yielding means pressing the slidable member in one direction, means for limiting movement in that direction and centrifugal means supported on said driven rotary member for pressing on the inclined face of the slidable member transversely to the axis of the driven rotary member for moving the slidable member in the opposite direction, substantially as described.

In testimony whereof I have signed my name, this 10th day of April, in the year one thousand nine hundred and twenty-three.

ISAAC D. KENNER.